(12) United States Patent
Bendorf

(10) Patent No.: US 10,766,318 B2
(45) Date of Patent: Sep. 8, 2020

(54) TIRE LEVER

(71) Applicant: Snap-on Incorporated, Kenosha, WI (US)

(72) Inventor: Scott A Bendorf, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 181 days.

(21) Appl. No.: 16/028,782

(22) Filed: Jul. 6, 2018

(65) Prior Publication Data

US 2020/0009929 A1    Jan. 9, 2020

(51) Int. Cl.
*B60C 25/02* (2006.01)

(52) U.S. Cl.
CPC .................. *B60C 25/02* (2013.01)

(58) Field of Classification Search
CPC ......... B60C 25/00; B60C 25/02; B60C 25/12; B60C 25/01; B60C 25/015; B25B 27/0071
See application file for complete search history.

(56) References Cited

U.S. PATENT DOCUMENTS

| 834,908 A | 11/1906 | Hussey |
|---|---|---|
| 951,200 A | 3/1910 | Pilliner |
| 965,858 A | 8/1910 | Bellew |
| 1,003,030 A | 9/1911 | Burt |
| 1,059,128 A | 4/1913 | Edwards |
| 1,175,189 A | 3/1916 | Stoup |
| 1,183,690 A | 5/1916 | Stewart |
| 1,305,337 A | 6/1919 | Bjornlie |
| 1,444,226 A | 2/1923 | Wallace |
| 1,507,208 A | 9/1924 | Schlenker |
| 1,567,025 A | 12/1925 | Allison |
| 2,112,661 A * | 3/1938 | Abrahams ............... B60C 25/02 157/1.1 |
| 2,188,211 A | 1/1940 | Tilson |
| 2,344,704 A | 3/1944 | Krantz |
| 2,485,700 A | 10/1949 | Cook |
| 2,509,945 A | 5/1950 | Strech et al. |
| 2,518,114 A | 8/1950 | Barber |
| 2,565,216 A | 8/1951 | Fox |
| 3,100,011 A | 8/1963 | Lydle |
| 3,717,193 A | 2/1973 | Craft |
| 3,823,756 A | 7/1974 | Rainey |

(Continued)

FOREIGN PATENT DOCUMENTS

| AU | 2003257518 | 5/2005 |
|---|---|---|
| FR | 908825 | 4/1946 |

(Continued)

OTHER PUBLICATIONS

UK Combined Search and Examination Report for Application No. GB1900497.7 dated Jun. 17, 2019, 7 pages.

(Continued)

*Primary Examiner* — David B. Thomas
(74) *Attorney, Agent, or Firm* — Seyfarth Shaw LLP

(57) ABSTRACT

A tool, such as a tire lever, with a bead holder having a rounded head and a receiving area. In an embodiment, the tool has a first end that includes a tapered tip and a second end that is coupled to the bead holder. The receiving area of the bead holder fits over a flange of a rim such that the rounded head pushes a bead of a tire toward a drop center of the rim while using the flange as a fulcrum.

21 Claims, 4 Drawing Sheets

(56) References Cited

U.S. PATENT DOCUMENTS

| | | | |
|---|---|---|---|
| 3,851,694 | A | 12/1974 | Brosene, Jr. |
| 5,806,578 | A | 9/1998 | Gonzaga |
| 6,684,927 | B1 | 2/2004 | Kliskey |
| 6,736,183 | B2 | 5/2004 | Magnani |
| 7,156,141 | B1 | 1/2007 | Kliskey |
| 7,163,041 | B1 | 1/2007 | Tran |
| 7,261,136 | B1 | 8/2007 | Kliskey |
| 7,267,155 | B2 | 9/2007 | Brahler, II |
| 7,628,193 | B1 | 12/2009 | Tart |
| 9,289,650 | B2 * | 3/2016 | Willey .................. A63B 29/08 |
| 9,394,108 | B2 | 7/2016 | White et al. |
| 9,656,524 | B2 * | 5/2017 | Hermansen ............ B60C 25/02 |
| 2008/0223529 | A1 * | 9/2008 | Nemish .................. B60C 25/02 157/1.3 |
| 2016/0031647 | A1 | 2/2016 | White et al. |
| 2016/0185167 | A1 | 6/2016 | White et al. |

FOREIGN PATENT DOCUMENTS

| | | |
|---|---|---|
| GB | 191406696 | 9/1914 |
| GB | 143403 | 5/1920 |
| GB | 669087 | 3/1952 |

OTHER PUBLICATIONS

AU Examination Report No. 1 for Application No. 2019200187 dated Jul. 10, 2019, 5 pages.
Australian Examination Report No. 3 for Application No. 2019200187 dated Jul. 6, 2020, 4 pages.
Taiwan Office Action for Application No. 10920435870 dated May 8, 2020, 14 pages.
CA Office Action for Application No. 3,031,753 dated Dec. 10, 2019, 9 pages.
Australia Examination Report No. 2 for Application No. 2019200187 dated Jun. 4, 2020, 6 pages.

* cited by examiner

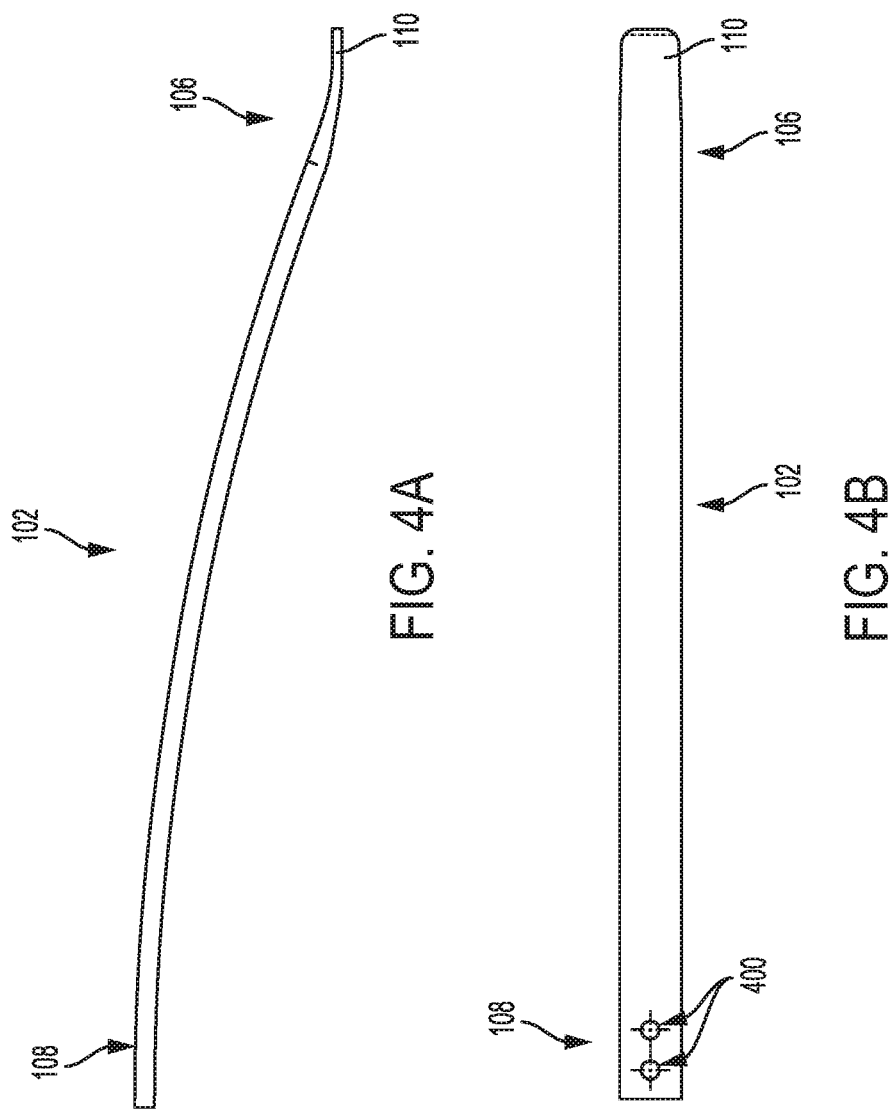

TIRE LEVER

TECHNICAL FIELD OF THE INVENTION

The present invention relates generally to tools, such as levers. More particularly, the present invention relates to a tire lever having a bead holding device for adjusting a tire on a rim.

BACKGROUND OF THE INVENTION

When mounting a tire, it is often difficult to position a top bead of the tire onto a rim. This is because the top bead is typically stiff and difficult to maneuver. Failure to correctly position the top bead of the tire on the rim may result in damage to the tire or inability to maintain tire pressure. Current tools and techniques for mounting tires include complex machinery or milling of conventional tire levers.

SUMMARY OF THE INVENTION

The present invention broadly comprises a tool, such as a tire lever, with a bead holder having a rounded head and a receiving area. In an embodiment, the tool has a first end that includes a tapered tip and a second end that is coupled to the bead holder. The receiving area of the bead holder fits over a flange of a tire rim, such that the rounded head pushes a bead of a tire towards a center of the rim while using the flange as a fulcrum.

In another embodiment, the present invention broadly comprises a method of mounting a tire. The method includes engaging a flange of a tire rim with a bead holder. For example, the bead holder includes a rounded head and a receiving area. The method further includes pivoting the bead holder against a bead of the tire using the flange as a fulcrum. The method further includes pushing the bead of the tire towards a drop center of the rim with the rounded head of the bead holder.

In another embodiment, the present invention broadly comprises a system including a rim, a tire, a lever, and a bead holder coupled to the lever. The lever includes a first end having a tapered tip and a second end coupled to the bead holder. The bead holder includes a rounded head and a receiving area. For example, the receiving area of the bead holder fits over a flange of the rim and the rounded head pushes a bead of the tire towards a center of the rim while using the flange as a fulcrum.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

FIG. 4A is a side view of a lever of the tool of FIG. 1.

FIG. 4B is a bottom view of the lever of FIG. 4A.

DETAILED DESCRIPTION OF THE EMBODIMENTS

Figure 1:
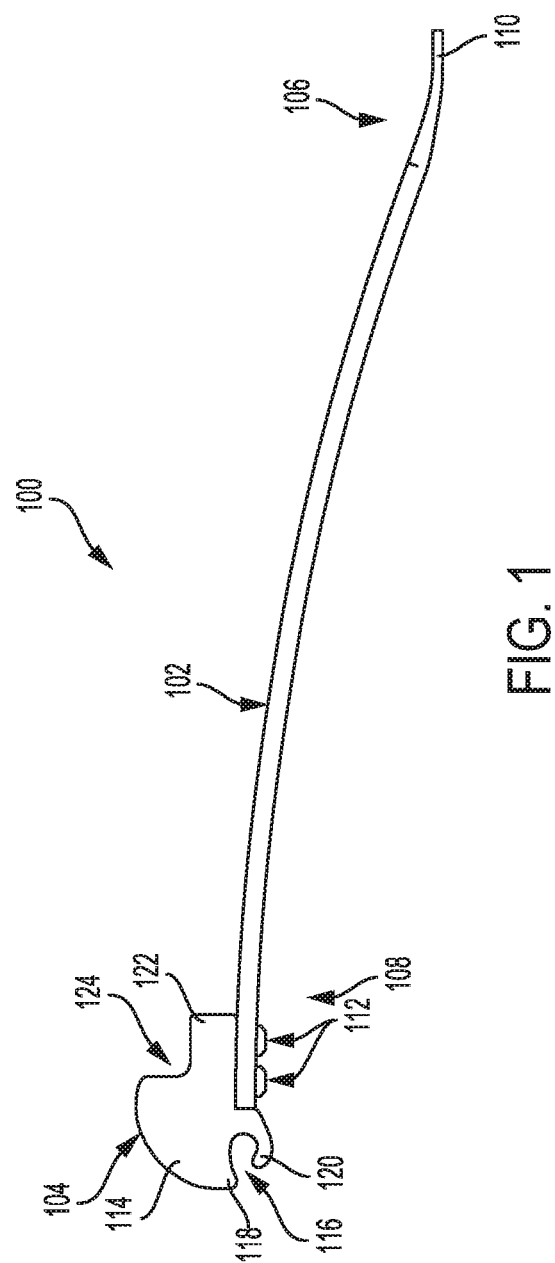
FIG. 1 is a side view of a tool and a wheel according to an embodiment of the present invention.

While the present invention is susceptible of embodiments in many different forms, there is shown in the drawings, and will herein be described in detail, embodiments of the invention, including a preferred embodiment, with the understanding that the present disclosure is to be considered as an exemplification of the principles of the present invention and is not intended to limit the broad aspect of the invention to any one or more embodiments illustrated herein. As used herein, the term "present invention" is not intended to limit the scope of the claimed invention, but is instead used to discuss exemplary embodiments of the invention for explanatory purposes only.

The present invention includes a tool, such as a tire lever, that broadly comprises a bead holder having a rounded head and a receiving area. In an embodiment, the tool has a lever or handle portion with a first end that includes a tapered tip and a second end that is coupled to the bead holder. The receiving area of the bead holder fits over a flange of a tire rim such that the rounded head pushes a bead of a tire towards a drop center of the rim while using the flange as a fulcrum.

Referring to FIG. 1, a tool 100, such as a tire lever, includes a lever 102 and a bead holder 104. The lever 102 includes a first end 106 and a second end 108. The first end 106 includes a tapered tip 110. According to an aspect of the present invention, the tapered tip 110 may be curved or flat. A body of the lever 102 may also be curved or flat. In an example, the body of the lever 102 has a curvature, and the tip 110 has a curvature opposite that of the curvature of the body of the lever 102. The tapered tip 110 may be used to facilitate dismounting or removal of a tire from a rim, by using the tapered tip 110 to pry a bead of the tire over the flange of a rim.

The second end 108 of the tool 100 is coupled to the bead holder 104. For example, the bead holder 104 may be coupled to the second end 108 of the tool 100 via fasteners 112. According to an aspect of the present invention, the fasteners 112 may include screws, such as cap screws. Of course, it is to be understood that this is exemplary only, and other fastening means may be used, such as, rivets, nails, adhesives, welding, etc. The bead holder 104 and lever 102 may also be integrally formed as a monolithic piece.

The bead holder 104 includes a rounded head 114, a receiving area 116 (such as a mouth), and a lip 120. For example, the rounded head 114 may be arc-shaped to facilitate smooth contact with a tire. The rounded head 114 may also have flat sides. The receiving area 116 may be an opening or recess located below the rounded head 114. The receiving area 116 may be adapted to fit over a flange of a rim without damaging the rim. The rounded head 114 includes a beak 118 formed on a first side of the receiving area 116, and a lip 120 is formed on a second side of the receiving area 116. The receiving area 116 is defined in the space between the beak 118 and the lip 120. The beak 118 may be rounded to avoid damage to a rim. Similarly, the lip 120 may be rounded and curved upwardly toward the beak 118 to provide an engagement surface adapted to engage a flange of a rim.

The bead holder 104 may further include a neck 122 adapted to couple to the lever 102. The neck 122 may be located adjacent to the rounded head 114, and the bead holder 104 may be coupled to the second end 108 of the lever 102 via the neck 122. According to an aspect of the present invention, the neck 122 may be thicker than the lever 102 and thinner than the rounded head 114. For example, the rounded head 114 may include a drop-off portion 124 that forms the neck 122.

Figure 2:
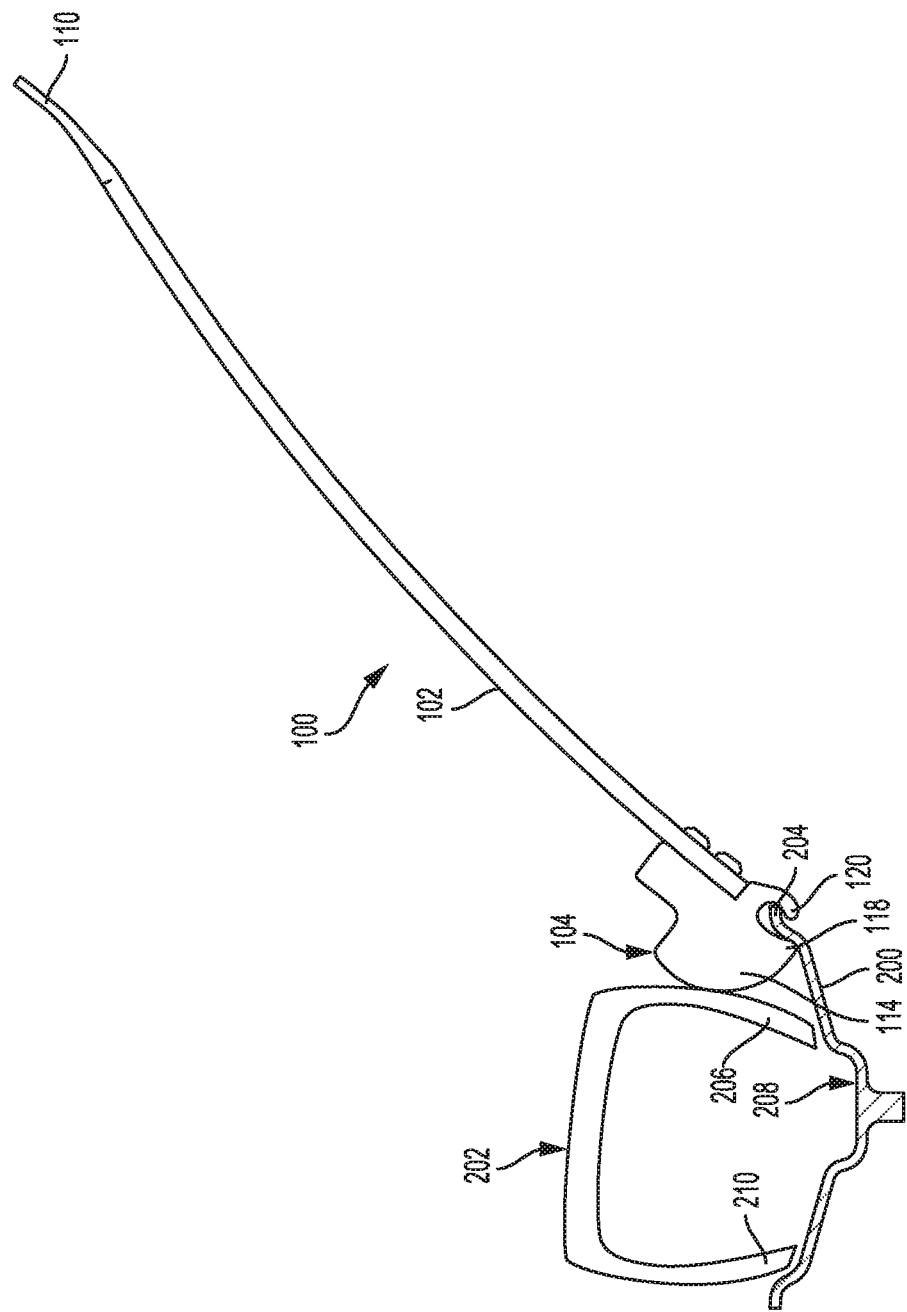
FIG. 2 is a side view of the tool of FIG. 1 engaging a typical rim or tire.

Referring to FIG. 2, the tool 100 engages a conventional rim 200 and a tire 202 to mount the tire 202 onto or remove the tire 202 from the rim 200. The tire 202 includes beads 210 and 206 (such as a first bead 210 and a second bead 206). The rim 200 includes a flange 204 and a drop center 208. In an example, the receiving area 116 receives and/or fits over the flange 204 of the rim 200 and the rounded head 114 pushes the bead of the tire 202 toward the drop center 208 of the rim 200 while using the flange 204 as a fulcrum.

For example, in operation, the receiving area 116 of the bead holder 104 engages the flange 204 of the rim 200. The rounded head 114 of the bead holder 104 is positioned against the bead 206 of the tire 202. The tool 100 is pivoted away from an axis of the rim 200, using the flange 204 as a fulcrum. As a result, the rounded head 114 pushes against the bead 206 of the tire, such that the bead 206 is moved over the flange 204 and positioned into the drop center 208 of the rim 200. The first bead 210 may be positioned onto the rim 200 in a similar manner as the bead 206. As the rounded head 114 pushes the bead(s) 206/210 toward the drop center 208, another device may be used to push the bead(s) 206/210 on roughly the opposite side of the rim 200 over the flange 204. This could be a second tool 100, a tire lever, a tire mounting machine mount/dismount head, bead holders, etc. or any combination of these that allows the operator to circumferentially work the bead(s) 206/210 over the flange 204 until the bead(s) 206/210 is completely over the flange 204.

Figure 3A:
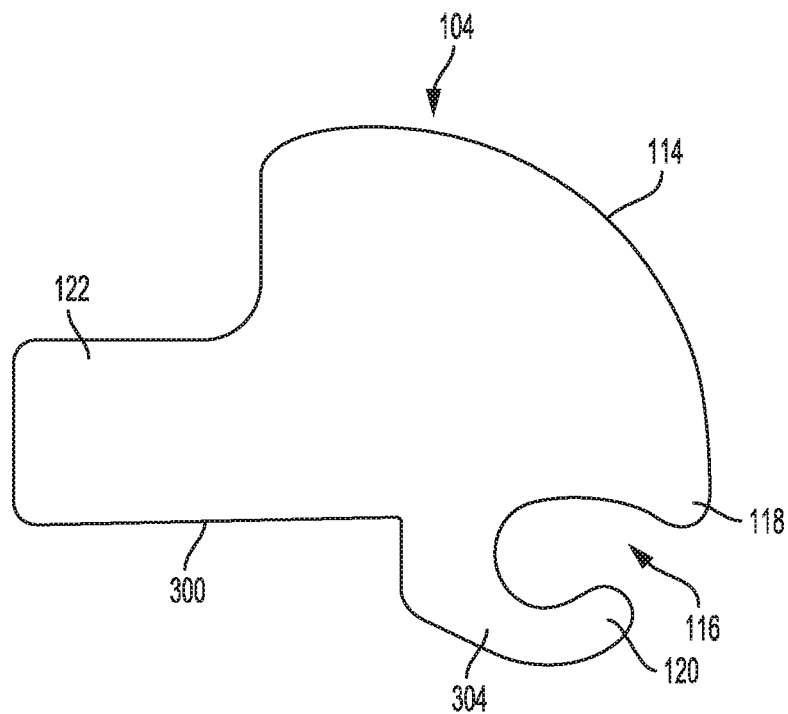
FIG. 3A is a side view of a bead holder of the tool of FIG. 1.
Figure 3B:
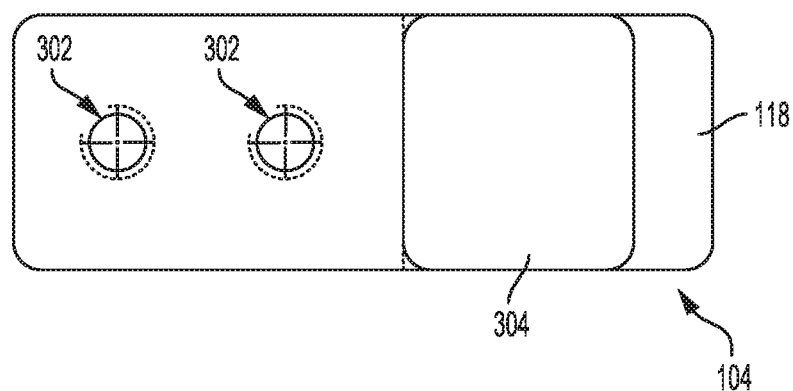
FIG. 3B is a bottom view of the bead holder of FIG. 3A.

Referring to FIGS. 3A and 3B, the bead holder 104 further includes a coupling surface 300 on a bottom portion of the neck 122 for coupling the bead holder 104 to the lever 102. For example, the coupling surface 300 may be substantially flat, and may include apertures 302 (e.g., fastener holes) adapted to mate with screws (e.g., cap screws). Although two apertures 302 are illustrated, it is understood that at least one aperture, or more, may be included.

The bead holder 104 further includes a jaw 304. For example, the jaw 304 is disposed adjacent to the neck 122 and below the rounded head 114 of the bead holder 104. The jaw 304 may protrude downwardly below the neck 122 and the rounded head 114 at, for example, a 90 degree angle. Although, other angles may be used. The jaw 304 may also curve upwardly towards the beak 118 to form the lip 120.

According to an aspect of the present invention, the beak 118 may protrude further from the bead holder 104 than the jaw 304/lip 120, when viewed from below as in FIG. 3B. For example, the beak 118 may be offset from the lip 120 by 13.3% of a total length of the bead holder 104.

Referring to FIGS. 4A and 4B, the lever 102 includes the first end 106 opposite and distal from the second end 108. The first end 106 includes the tapered tip 110. The lever 102 further includes apertures 400 (e.g., fastener holes) adapted to align with the apertures 302 of the bead holder 104. The apertures 400 are disposed at the second end 108 of the lever 102. For example, when the apertures 400 of the lever 102 are aligned with the apertures 302 of the coupling surface 300 of the bead holder 104, the fasteners 112 may then couple the bead holder 104 to the lever 102. Although two apertures 400 are illustrated on the lever 102, it is understood that at least one, or more, apertures may be included. Additionally, a number of apertures on the lever 102 may match a number of apertures on the bead holder 104.

The lever 102 may be substantially straight or slightly curved. The tapered tip 110 may have a curvature opposite that of the lever 102. In this way, leverage may be provided by the lever 102. In operation, the lever 102 may act as a handle for the bead holder 104. According to an aspect of the present invention, the lever 102 may be a same width as, wider than, or narrower than, a width of the bead holder 104. For example, the width of the lever 102 may be within a few inches or centimeters of the width of the bead holder 104. Additionally, a length of the bead holder may be 17.39% a length of the lever 102.

Advantages of the tool 100 include no need for milling of the lever 102 for coupling the bead holder 104 to the lever 102. The bead holder 104 is mounted onto the lever 102 via fasteners 112. This results in lower cost and more efficient manufacturing, which is an improvement over conventional devices and methods that require complex machinery or milling of conventional tire levers for a similar purpose.

As used herein, the term "coupled" and its functional equivalents are not intended to necessarily be limited to direct, mechanical coupling of two or more components. Instead, the term "coupled" and its functional equivalents are intended to mean any direct or indirect mechanical, electrical, or chemical connection between two or more objects, features, work pieces, and/or environmental matter. "Coupled" is also intended to mean, in some examples, one object being integral with another object.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of the inventors' contribution. The actual scope of the protection sought is intended to be defined in the following claims when viewed in their proper perspective based on the prior art.

What is claimed is:

1. A tool for installing or removing a tire having a bead on a rim having a flange and a drop center, the tool comprising:
   a lever having first and second ends; and
   a bead holder coupled to the second end, wherein the bead holder includes a receiving area and a head having a rounded surface, wherein the head includes a beak portion and a lip portion forming the receiving area, and the receiving area is adapted to engage the flange of the rim and the rounded surface of the head is adapted to engage the bead of the tire proximal to the flange to push the bead towards the drop center of the rim using the flange as a fulcrum.

2. The tool of claim 1, wherein the lever is curved.

3. The tool of claim 1, wherein the head includes flat sides.

4. The tool of claim 1, wherein the rounded surface of the head is arc-shaped.

5. The tool of claim 1, wherein the bead holder includes a neck.

6. The tool of claim 5, wherein the neck is proximal to the head.

7. The tool of claim 5, wherein the neck includes a fastener hole.

8. The tool of claim 1, wherein the bead holder is coupled to the lever via a fastener.

9. The tool of claim 8, wherein the fastener is a cap screw.

10. The tool of claim 1, wherein the receiving area includes a circular opening.

11. The tool of claim 1, wherein the lip portion is curved upwardly toward the beak portion.

12. The tool of claim 1, wherein the beak portion is offset from the lip portion by about 13.3% of a length of the bead holder.

13. A method of mounting a tire having a bead to a rim having a flange and a drop center, the method comprising:
disposing the flange of the rim in a receiving area of a bead holder, the bead holder having a head with a rounded surface, wherein the head includes a beak portion and a lip portion forming the receiving area;
pivoting, using the flange as a fulcrum, the rounded surface against the bead of the tire proximate to the flange; and
pushing, with the rounded surface of the head of the bead holder, the bead of the tire towards the drop center of the rim.

14. The method of claim 13, further comprising rotating the rim and tire while pushing against the bead of the tire with the surface of the head until the tire is seated on the rim.

15. The method of claim 14, wherein the receiving area of the bead holder engages the flange.

16. The method of claim 13, wherein the bead holder is pivoted away from an axis of the rim.

17. A system comprising:
a rim including a flange and a drop center;
a tire including a bead, wherein the bead is disposed proximal to the flange;
a lever having first and second ends, the first end includes a tapered tip; and
a bead holder coupled to the second end, the bead holder includes a receiving area and a head with a rounded surface, wherein the head includes a beak portion and a lip portion forming the receiving area, and the receiving area is adapted to engage the flange and the rounded surface of the head is adapted to engage the bead to push the bead towards the drop center using the flange as a fulcrum.

18. The system of claim 17, wherein the lever is curved.

19. The system of claim 17, wherein the head includes flat sides.

20. The system of claim 17, wherein the rounded surface of the head is arc-shaped.

21. The system of claim 17, wherein the bead holder incudes a neck coupled to the second end of the lever.

* * * * *